US010880674B2

(12) United States Patent
Jahangir et al.

(10) Patent No.: US 10,880,674 B2
(45) **Date of Patent: *Dec. 29, 2020**

(54) SIP OPTIONS BASED LOCATION DETERMINATION

(71) Applicant: T-Mobile USA, Inc., Bellevue, WA (US)

(72) Inventors: Zeeshan Jahangir, Snoqualmie, WA (US); Muhammad Ejaz Sial, Monroe, WA (US); Shujaur Mufti, Snoqualmie, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/544,586

(22) Filed: Aug. 19, 2019

(65) Prior Publication Data

US 2019/0373401 A1 Dec. 5, 2019

Related U.S. Application Data

(63) Continuation of application No. 15/693,228, filed on Aug. 31, 2017, now Pat. No. 10,412,537.

(51) Int. Cl.
*H04W 4/02* (2018.01)
*H04W 80/10* (2009.01)

(52) U.S. Cl.
CPC ............. *H04W 4/02* (2013.01); *H04W 80/10* (2013.01)

(58) Field of Classification Search
CPC ............. H04L 65/1006; H04L 65/1016; H04L 65/1073; H04L 65/1069; H04L 69/22; H04L 67/18; H04L 61/6054; H04L 63/0853; H04L 65/104; H04L 67/14; H04L 29/06027; H04L 67/04; H04L 51/38;

(Continued)

(56) References Cited

U.S. PATENT DOCUMENTS 10,412,537 B2 * 9/2019 Jahangir ................. H04W 4/02
2003/0120813 A1 6/2003 Majumdar et al.

(Continued)

OTHER PUBLICATIONS

3GPP(TM), "3GPP TS 23.271; Functional Stage 2 Description of Location Services (LCS) (Release 14)", Jun. 12, 2017, 184 pages.

(Continued)

*Primary Examiner* — Nimesh Patel
(74) *Attorney, Agent, or Firm* — Lee & Hayes, P.C.

(57) ABSTRACT

Systems and methods provided herein are directed to a mechanism for determining current or currently known location of a user equipment (UE). Upon receiving a request regarding location information of the UE, a gateway mobile location center (GMLC) may send a SIP OPTIONS to an interrogating call session control function (I-CSCF). In response to receiving the SIP OPTIONS, the I-CSCF may perform a location information request (LIR) and a location information answer (LIA) with the HSS to locate a serving call session control function (S-CSCF) where the UE is registered. The S-CSCF may route the SIP OPTIONS to an application server (AS) to request the registered location information of the UE, and in response, the AS may send a 200 OK, as an acknowledgment, to the S-CSCF, that includes location information of the UE provided during registration of the UE.

20 Claims, 4 Drawing Sheets

(58) Field of Classification Search
CPC . H04L 61/1588; H04L 61/2076; H04L 67/24; H04L 65/1009; H04L 65/102; H04L 12/1407; H04L 65/105; H04L 67/306; H04W 4/02; H04W 4/90; H04W 64/00; H04W 76/50; H04W 4/025; H04W 60/00; H04W 12/08; H04W 8/00; H04W 76/10; H04W 4/60; H04W 8/10; H04W 68/00; H04W 88/16; H04W 8/08; H04W 80/00; H04W 84/005; H04W 16/32; H04W 8/12; H04W 8/06; H04W 8/04; H04W 12/06; H04W 92/20; H04W 36/10; H04W 40/20; H04W 60/06; H04M 2242/30; H04M 7/006; H04M 2207/18; H04M 3/42348; H04M 3/42365; H04M 2207/20; H04M 2215/202; H04M 7/125; H04M 15/8038; H04M 2215/2026; H04M 2215/2046; H04M 2215/34; H04M 2215/7442; H04M 15/90; H04M 2215/204; H04M 2207/12; G01S 19/42
See application file for complete search history.

(56) References Cited

U.S. PATENT DOCUMENTS

2004/0072593 A1 4/2004 Robbins et al.
2005/0114513 A1 5/2005 Dorenbosch et al.
2006/0077932 A1 4/2006 Takeda et al.
2006/0114885 A1 6/2006 Baek et al.
2006/0242307 A1 10/2006 Jung et al.
2006/0271693 A1 11/2006 Thiebaut et al.
2007/0032243 A1 2/2007 Muller
2010/0041418 A1 2/2010 Edge et al.
2010/0165966 A1 7/2010 Petion et al.
2011/0256885 A1 10/2011 Kojo et al.
2013/0171974 A1 7/2013 Bae
2013/0231078 A1 9/2013 Bharatia et al.
2014/0086108 A1 3/2014 Dunn et al.
2014/0086147 A1 3/2014 Narkar et al.
2019/0069126 A1 2/2019 Jahangir et al.

OTHER PUBLICATIONS

3GPP(TM), "3rd Generation Partnership Project; Technical Specification Group Core Network and Terminals; Location Services (LCS); Diameter-based SLh interface for Control Plane LCS (Release 13)", 2017, 19 pages.
Office action for U.S. Appl. No. 15/693,228, dated Mar. 7, 2019, Jahangir, "SIP Options Based Location Determination", 11 pages.
PCT Search Report and Written Opinion for Application No. PCT/US2018/045631, dated Nov. 27, 2018, 10 pages.

* cited by examiner

SIP OPTIONS BASED LOCATION DETERMINATION

CROSS REFERENCE TO RELATED APPLICATIONS

This application is a continuation of, and claims priority to, co-pending, commonly-owned, U.S. patent application Ser. No. 15/693,228, filed on Aug. 31, 2017, which is incorporated herein in its entirety by reference.

BACKGROUND

Modern telecommunication systems include heterogeneous mixtures of second, third, and fourth generation (2G, 3G, and 4G) cellular-wireless access technologies, which can be cross-compatible and can operate collectively to provide data communication services. Global Systems for Mobile (GSM) is an example of 2G telecommunications technologies; Universal Mobile Telecommunications System (UMTS) is an example of 3G telecommunications technologies; and Long Term Evolution (LTE), including LTE Advanced, and Evolved High-Speed Packet Access (HSPA+) are examples of 4G telecommunications technologies. The 5G telecommunication technologies are the next generation mobile networks that are designed to combine both an evolution and revolution of the existing LTE/LTE-A mobile networks to provide a much higher connectivity, greater throughput, much lower latency, and ultra-high reliability to support new use cases and applications. Some of mobile devices operating in such telecommunication systems are also capable of operating over Wi-Fi networks for voice, also known as Voice-over-IP (VoIP) and data.

A mobile device does not necessarily stay in one location for any length of time, and may move within a coverage area or from one coverage area to the next. For certain services, such as location based services and emergency services, ascertaining the current location of the mobile device, and its user, is important and may be time critical. However, due to the mobile nature of the mobile device, the user's location associated with mobile device may not be current in a mobile network.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Systems and methods discussed herein are directed to a mechanism for determining current or currently known location of a user equipment (UE). The UE may be a mobile device, such as a cellular phone, a smart phone, a laptop computer, or a tablet computer, an internet-of-things (IoT) device, a machine-to-machine communication capable device, and the like.

Upon receiving a request at a gateway mobile location center (GMLC) regarding location information of the UE, the GMLC may send a SIP OPTIONS including subscriber information in a request uniform resource identifier (RURI) or TO header to an interrogating call session control function (I-CSCF). The request may be a location service request from a client for the UE, and the SIP OPTIONS may be sent to the I-CSCF in addition to, or instead of, sending a Routing-Info-Request (RIR) to a home subscriber server (HSS). In response to receiving the SIP OPTIONS, the I-CSCF may perform a location information request (LIR) and a location information answer (LIA) with the HSS to locate a serving call session control function (S-CSCF) where the UE is registered. The S-CSCF may route the SIP OPTIONS to an application server (AS) to request the registered location information of the UE, and in response, the AS may send a 200 OK, as an acknowledgment, to the S-CSCF, that includes location information of the UE provided during registration of the UE. The S-CSCF may then forward the 200 OK having the registered location information of the UE to the GMLC.

Alternatively, the SIP OPTIONS may be forwarded from the S-CSCF may be forwarded to a proxy call session control function (P-CSCF), and then forwarded to the UE where the UE obtains its current location, for example by utilizing its global positioning system (GPS) function, in response to receiving the SIP OPTIONS from the P-CSCF. The UE responds back to the P-CSCF by sending a 200 OK including its current location information. The P-CSCF forwards the 200 OK to the S-CSCF, which then forwards the 200 OK to the GMLC.

Figure 1:
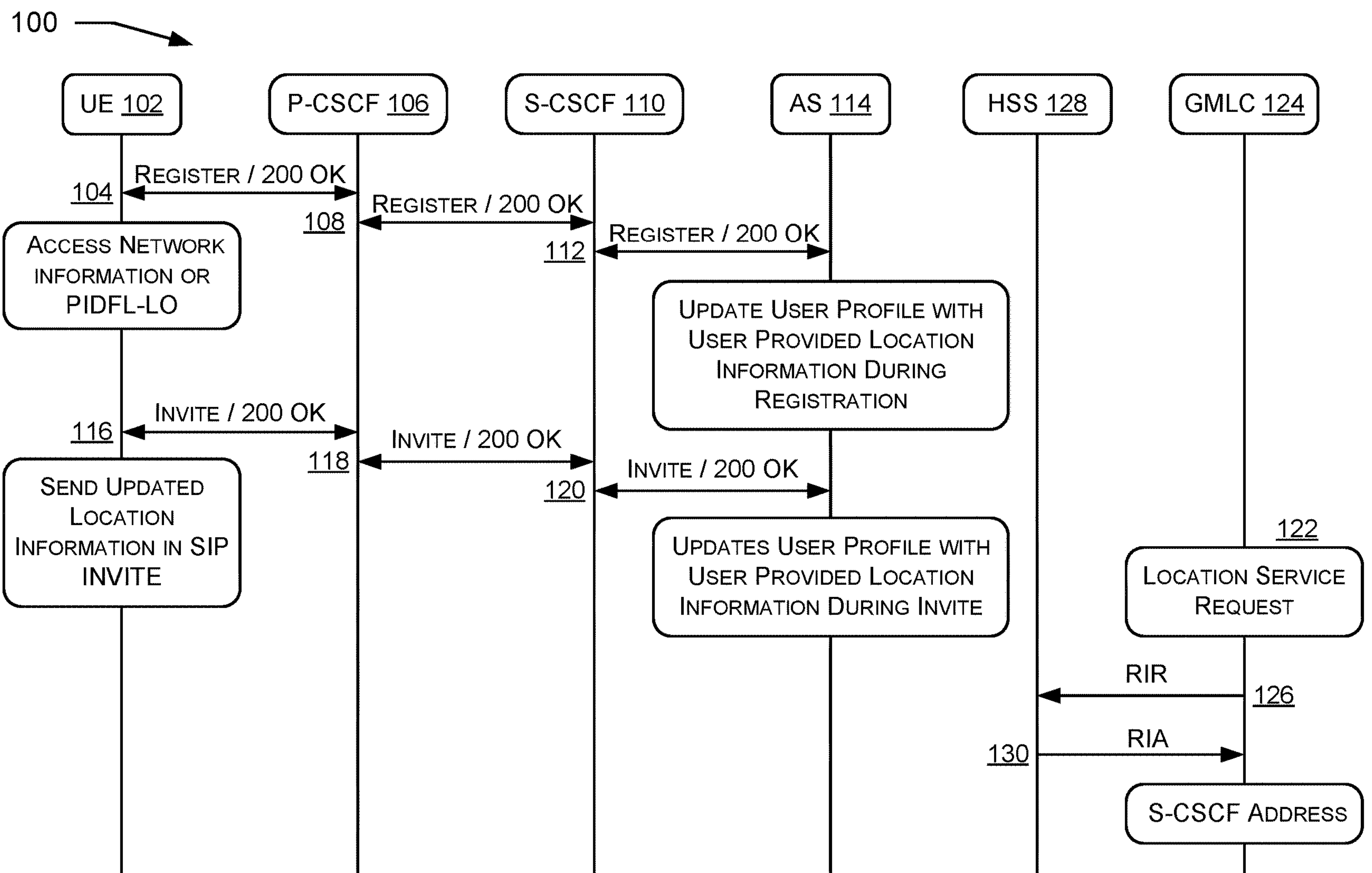
FIG. 1 illustrates an example flow diagram of determining location information of a user equipment (UE) based on the location information provided during the registration or SIP INVITE.

FIG. 1 illustrates an example flow diagram 100 of determining location information of a user equipment (UE) 102 based on the location information provided during the registration or SIP INVITE.

The UE 102 begins its registration process at 104 by registering with a proxy call session control function (P-CSCF) 106 and receiving a 200 OK from the P-CSCF 106. The UE 102 may send access network information or a presence information data format location Object (PIDFL-LO) to the P-CSCF 106. At 108, the P-CSCF 106 forwards the registration to a serving call session control function (S-CSCF) 110, and the S-CSCF 110 responds back with a 200 OK. At 112, the S-CSCF 110 forwards the registration to an application server (AS) 114, and the AS 114 responds back with a 200 OK. The AS 114 may update the user profile with user provided location information during the registration.

The UE 102 may send a SIP INVITE to the P-CSCF 106 at 116 and receive a 200 OK from the P-CSCF 106. The UE 102 may send updated location information to the P-CSCF 106 in the SIP INVITE. At 118, the P-CSCF 106 forwards the SIP INVTE to the S-CSCF 110, and the S-CSCF 110 responds back with a 200 OK. At 120, the S-CSCF 110 forwards the SIP INVITE to the AS 114, and the AS 114 responds back with a 200 OK. The AS 114 may update the user profile with user provided location information during the registration.

At 122, a client may request location service request for the UE 102, which is received by a gateway mobile location center (GMLC) 124. The GMLC 124, at 126, sends a Routing-Info-Request (RIR) including inquiries regarding the name of the S-CSCF 110, user name of the UE 102, mobile station international subscriber directory number (MSISDN) to a home subscriber server (HSS) 128. In response, the HSS 128 sends back a Routing-Info-Answer (RIA) at 130, which may include the address of the S-CSCF, if the UE 102 is Internet Protocol (IP) Multimedia Subsystem (IMS) registered, the UE location information of the registration, or the SIP INVITE, may be kept.

Figure 2:
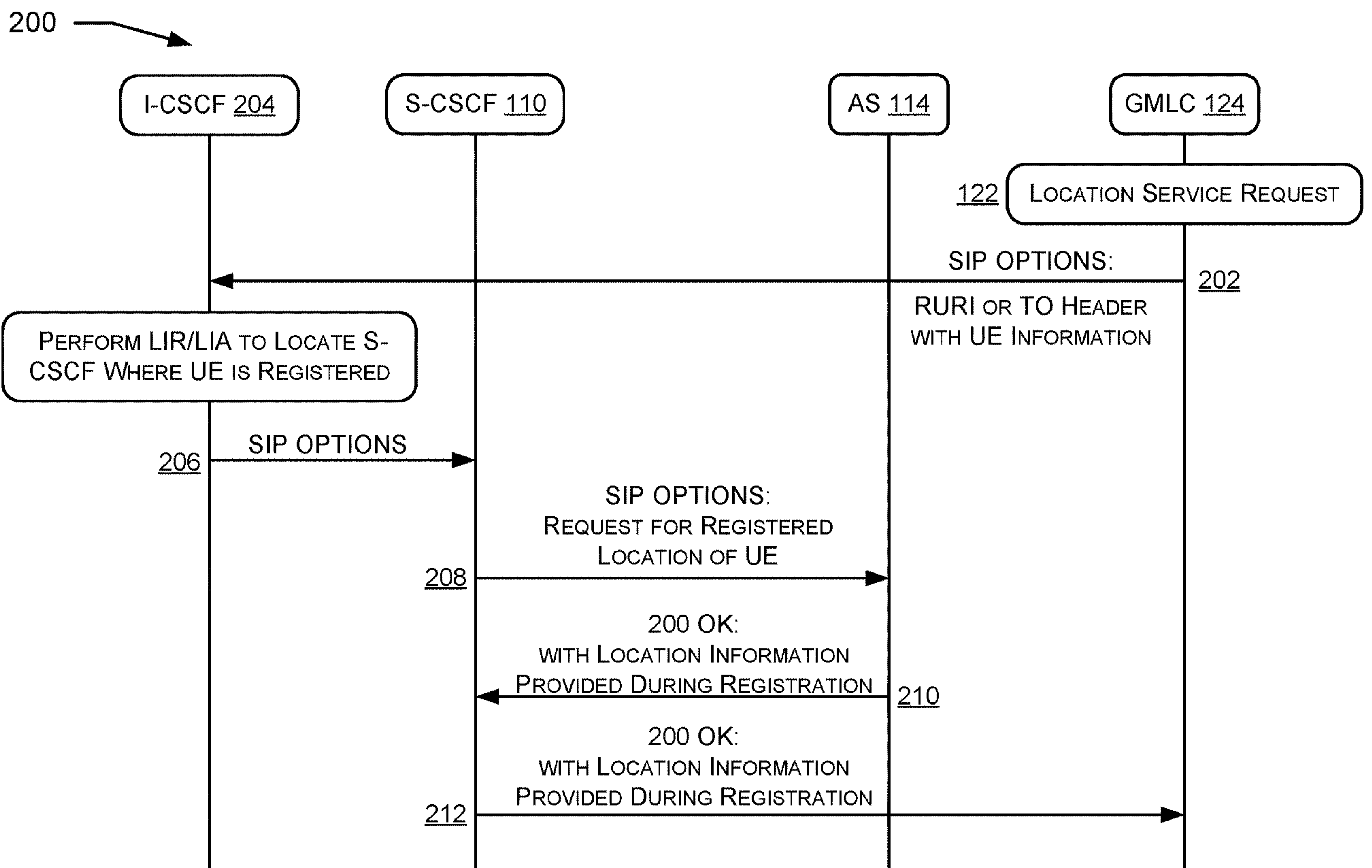
FIG. 2 illustrates an example flow diagram of determining location information of the UE utilizing SIP OPTIONS.

FIG. 2 illustrates an example flow diagram 200 of determining location information of the UE 102 utilizing SIP OPTIONS.

Continuing from FIG. 1, after receiving the location service request for the UE 102 from the client at 122, the GMLC 124 may, at 202, send SIP OPTIONS to an interrogating call session control function (I-CSCF) 204 with the UE information in a request uniform resource identifier (RURI) header or in a TO header of the SIP OPTIONS. The GMLC 124 may send the SIP OPTIONS at 202 in addition to, or instead of, sending the RIR to the HSS 128 at 126.

In response to receiving the SIP OPTIONS, the I-CSCF 204 may perform a location information request (LIR) and a location information answer (LIA) with the HSS 128 to locate the S-CSCF 110 where the UE 102 is registered, and may route the SIP OPTIONS to S-CSCF 110 at 206. In response, at 208, the S-CSCF 110 may forward the SIP OPTIONS to the AS 114 to request for the registered location of the UE 102, and the AS 114 may correspond back to the S-CSCF 110 at 210, with a 200 OK including the location information of the UE 102 provided during the registration of the UE 102. The S-CSCF 110, at 212, may then route the 200 OK with the location information of the UE 102 provided during the registration of the UE 102 to the GMLC 124.

Figure 3:
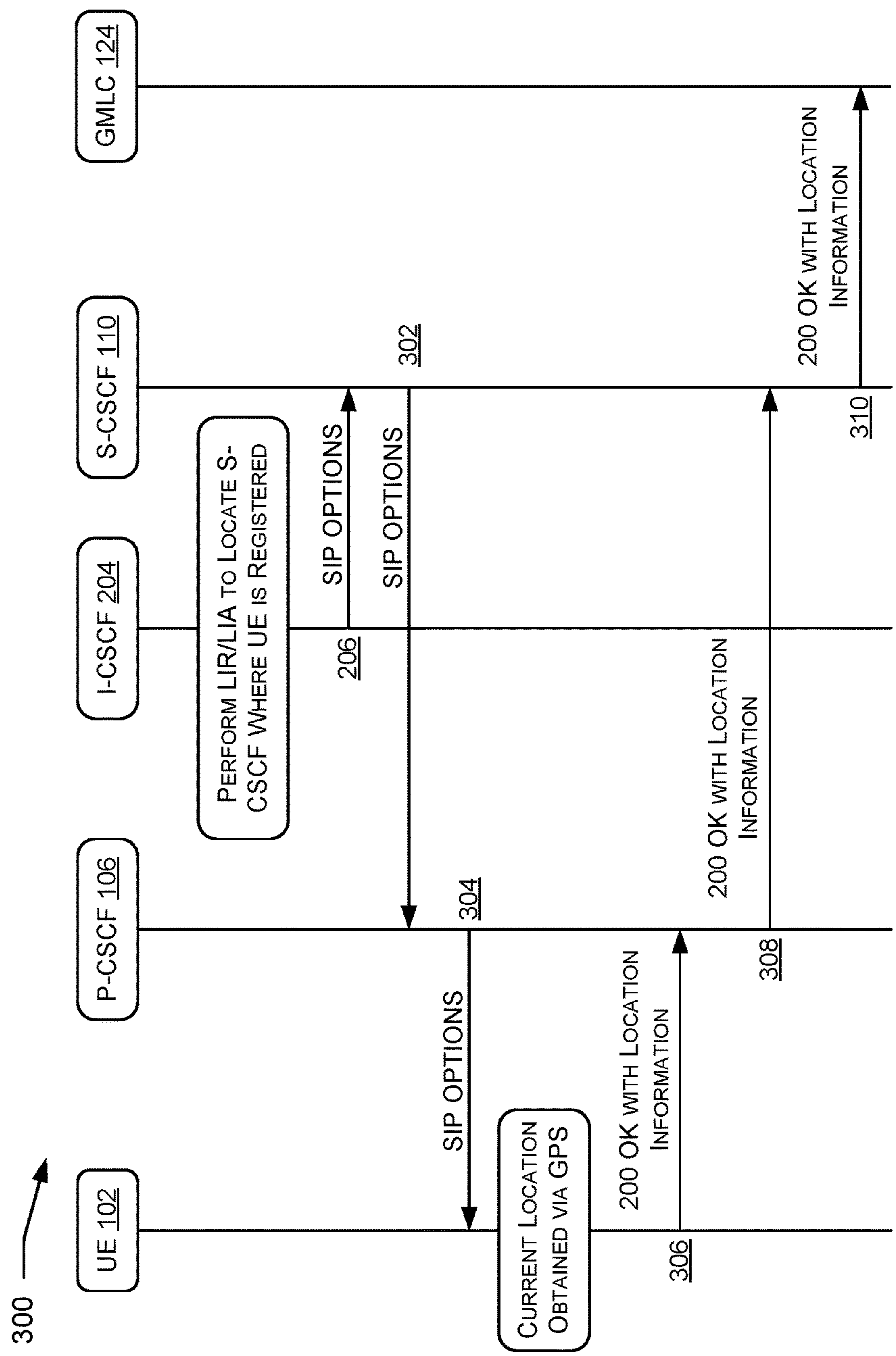
FIG. 3 illustrates another example flow diagram of determining location information of the UE utilizing SIP OPTIONS.

FIG. 3 illustrates another example flow diagram 300 of determining location information of the UE 102 utilizing SIP OPTIONS.

Continuing from FIG. 2, after the I-CSCF 204 performs the LIR and LIA, and routes the SIP OPTIONS to S-CSCF 110 at 206, the S-CSCF 110 may forward the SIP OPTIONS, at 302, to the P-CSCF 106. The P-CSCF 106 may forward the SIP OPTIONS at 304 to the UE 102, and in response, the UE 102 may obtain its current location information, for example, via a global positioning system (GPS). The UE 102 may then transmit a 200 OK that includes the current location information of the UE 102 to the P-CSCF 106 at 308. The P-CSCF 106 may then forward the 200 OK to the S-CSCF 110 at 308, and the S-CSCF 110 may forward the 200 OK to the GMLC 124 at 310.

Figure 4:
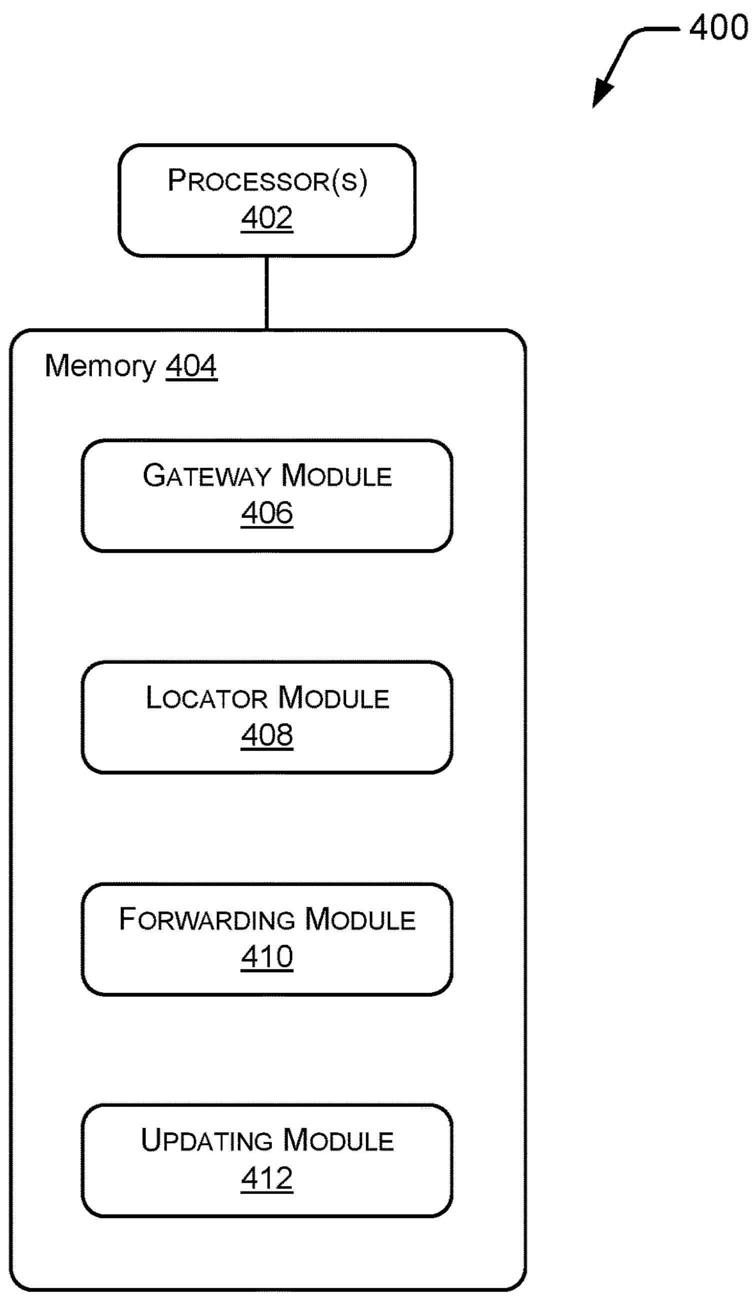
FIG. 4 illustrates an example block diagram of a system for determining location information of the UE utilizing SIP OPTIONS.

FIG. 4 illustrates an example block diagram of a system 400 for determining location information of the UE 102 utilizing SIP OPTIONS.

The system 400 may comprise one or more processors 402 and memory 404 communicatively coupled to the one or more processors 402. The memory 404 may comprise a plurality of modules that are communicatively coupled to each other. The plurality of modules may comprise a gateway module 406, a locator module 408, a forwarding module 410, and an updating module 412. The gateway module 406 may be configured to receive a location inquiry associated with the UE 102 at the GMLC 124 as described above with reference to FIG. 1, and in response to receiving the location inquiry, may send a SIP OPTIONS to the I-CSCF 204. The SIP OPTIONS may include UE information in the RURI header or in a TO header, and may be sent in addition to, or instead of, sending the RIR to the HSS 128.

The locator module 408 may be configured to locate the S-CSCF 110, where the UE 102 is registered, by performing the LIR and the LIA with the HSS 128 at the I-CSCF 204. The forwarding module 410 may be configured to forward the SIP OPTIONS from the I-CSCF 204 to the S-CSCF 110 found as a result of performing the LIR and LIR. The updating module 412 may be configured to update the S-CSCF 110 with current location information of the UE 102 and to transmit the current location information of the UE 102 from the S-CSCF 110 to the GMLC 124.

As discussed with reference to FIG. 2, the updating module 412 may be further configured to send the SIP OPTIONS from the S-CSCF 110 to the AS 114 to request for registered location information of the UE 102, send a 200 OK including location information of the UE provided during registration of the UE 102 from the AS 114 to the S-CSCF 110, and forward the 200 OK including the registered location information of the UE 102 from the S-CSCF 110 to the GMLC 124. Alternatively, as discussed with referenced to FIG. 3, the updating module 412 may be further configured to forward the SIP OPTIONS from the S-CSCF 110 to the P-CSCF 106, forward the SIP OPTIONS from the P-CSCF 106 to the UE 102. The UE 102, in response to receiving the SIP OPTIONS, may obtain its current location information based on, for example, its internal GPS. The updating module 412 may be configured to transmit a 200 OK including the obtained current location of the UE 102 from the UE 102 to the P-CSCF 106, forward the 200 OK from the P-CSCF 106 to the S-CSCF 110, and forward the 200 OK having the current location of the UE 102 from the S-CSCF 110 to the GMLC 124.

Some or all operations of the methods described above can be performed by execution of computer-readable instructions stored on a computer storage medium, as defined below. The term "computer-readable instructions" as used in the description and claims, include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

The computer storage media may include volatile memory (such as random access memory (RAM)) and/or non-volatile memory (such as read-only memory (ROM), flash memory, etc.). The computer storage media may also include additional removable storage and/or non-removable storage including, but not limited to, flash memory, magnetic storage, optical storage, and/or tape storage that may provide non-volatile storage of computer-readable instructions, data structures, program modules, and the like.

A non-transient computer storage medium is an example of computer-readable media. Computer-readable media includes at least two types of computer-readable media, namely computer storage media and communications media. Computer storage media includes volatile and non-volatile, removable and non-removable media implemented in any process or technology for storage of information such as computer-readable instructions, data structures, program modules, or other data. Computer storage media includes, but is not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism. As defined herein, computer storage media do not include communication media.

The computer-readable instructions stored on one or more non-transitory computer storage media that, when executed by one or more processors, may perform operations described above with reference to FIGS. 1-4. Generally, computer-readable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method for acquiring location information of a user equipment (UE), the method comprising:

receiving, at a first session controller, a location inquiry associated with the UE, wherein receiving the location inquiry includes receiving a Session Initiation Protocol (SIP) OPTIONS comprising UE information;

sending, based in part on the location inquiry, a request including the UE information to a server;

receiving, from the server, an answer including an indication of a second session controller associated with the UE, the second session controller having registered location information of the UE;

locating, based on the indication, the second session controller;

forwarding, from the first session controller, the location inquiry to the second session controller;

causing, based at least on the location inquiry, the second session controller to update the registered location information associated with the UE, wherein updating the registered location information comprises:

sending, from the second session controller to the UE, the location inquiry associated with the UE; and receiving, at the second session controller, an indication of a current location associated with the UE; and receiving, from the second session controller, a response containing the current location associated with the UE.

2. The method of claim 1, wherein:

the first session controller is an Interrogating Call Session Control Function (I-CSCF);

the server is a Home Subscriber System (HSS);

the second session controller is a Serving Call Session Control Function (S-CSCF);

the Session Initiation Protocol (SIP) OPTIONS includes the UE information in a request uniform resource identifier (RURI) or TO header;

the request is a Location Information Request (LIR); and the answer is a Location Information Answer (LIA).

3. The method of claim 1, wherein receiving the location inquiry associated with the UE further comprises:

receiving the location inquiry from a gateway mobile location center (GMLC) associated with the first session controller.

4. The method of claim 1, wherein receiving the location inquiry further comprises one of:

receiving the location inquiry in addition to a Routing-Info-Request (RIR) transmitted to the server; or receiving the location inquiry without the RIR to the server.

5. The method of claim 1, wherein causing the second session controller to update the registered location information further comprises:

receiving, at the second session controller, an acknowledgement from an application server the acknowledgment including the current location of the UE provided during registration of the UE, wherein the acknowledgment is a 200 OK.

6. The method of claim 1, wherein causing the second session controller to update the registered location information comprises:

transmitting, and via at least a third session controller, the location inquiry to the UE; and causing, by the location inquiry, the UE to transmit an acknowledgement including current location information of the UE to the second session controller via at least the third session controller.

7. The method of claim 1, wherein sending the location inquiry to the UE causes the UE to generate and transmit the indication of the current location to the second session controller, wherein UE obtains the current location via a global positioning system.

8. A non-transitory computer storage medium storing computer-readable instructions executable by a computer, that when executed by the computer, cause the computer to perform operations comprising:

receiving a location inquiry associated with a UE;

sending, in response to receiving the location inquiry, a request to a first session controller, wherein sending the request includes sending a Session Initiation Protocol (SIP) OPTIONS comprised of UE information and causing the first session controller to:

transmit an information request to a server; and receive, from the server, an indication;

locating, based on the indication, a second session controller, the second session controller having registered location information associated with the UE;

causing the first session controller to transmit the request to the second session controller;

causing, by the request, the second session controller to update the registered location information associated with the UE, wherein updating the registered location information comprises:

sending, from the second session controller to the UE, the request for current location information associated with the UE; and receiving, from the UE, an indication of the current location information associated with the UE; and receiving, from the second session control, the current location information associated with the UE.

9. The non-transitory computer storage medium of claim 8:

the computer is a gateway mobile location center (GMLC);

the first session controller is an Interrogating Call Session Control Function (I-CSCF); and the second session controller is a Serving Call Session Control Function (S-CSCF).

10. The non-transitory computer storage medium of claim 8, wherein sending the request to the first session controller further comprises one of:

sending the request to the first session controller in addition to sending a Routing-Info-Request (RIR) to a home subscriber server (HSS); or sending the request to the first session controller instead of sending the RIR to the HSS;

wherein the SIP OPTIONS includes the UE information in a request uniform resource identifier (RURI) header or in a TO header.

11. The non-transitory computer storage medium of claim 8, wherein:

transmit the information request to the server comprises transmitting a Location Information Request (LIR) to a Home Subscriber Server (HSS); and receive, from the server, the indication comprises receiving a Location Information Answer (LIA) from the HSS that includes the indication of a S-CSCF associated with the UE.

12. The non-transitory computer storage medium of claim 8, wherein causing the second session controller to update the registered location information further comprises:

receiving, at the second session controller, the current location information associated with the UE and provided during registration of the UE from an application server; and transmitting, from the second session controller, the current location information.

13. The non-transitory computer storage medium of claim 12, wherein the application server comprises a user profile associated with the UE, the user profile including user provided location information obtained during registration of the UE and via the second session controller.

14. The non-transitory computer storage medium of claim 8, wherein receiving current location information associated with the UE comprises:

receiving, from a S-CSCF, a 200 OK including the current location information of the UE.

15. The non-transitory computer storage medium of claim 8, wherein:

the location inquiry is received from a client and is a location service request for the UE; and receiving the current location information associated with the UE further comprises forwarding the current location information to the client.

16. A system for acquiring location information of a user equipment (UE), the system comprising:

one or more processors;

memory communicatively coupled to the one or more processors, the memory comprising a plurality of modules communicatively coupled to each other, the plurality of modules comprising:

a gateway module configured to:

receive a location inquiry associated with the UE;

determine UE information from the location inquiry; and send, in response to receiving the location inquiry, a request to a first session controller, wherein the request is a Session Initiation Protocol (SIP) OPTIONS including the UE information;

a locator module configured to:

receive an indication of a second session controller associated with the UE; and locate the second session controller;

a forwarding module configured to transmit the request to the second session controller; and an updating module configured to:

cause the second session controller to obtain current location information associated with the UE, wherein obtaining the current location information comprises:

transmitting, via the second session controller, the request to the UE; and receiving, at the second session controller, an indication of the current location associated with the UE; and receive the current location information associated with the UE.

17. The system of claim 16, wherein the gateway module is further configured to:

receive the location inquiry at a gateway mobile location center (GMLC); and transmit the request to an Interrogating Call Session Control Function (I-CSCF), the request including a request uniform resource identifier (RURI) or a TO header.

18. The system of claim 16, wherein the locator module is further configured to:

cause a I-CSCF to send a location information request (LIR) to, and receive a location information answer from, a Home Subscriber System (HSS).

19. The system of claim 16, wherein the updating module is further configured to:

cause the request to be forwarded from the second session controller to a third session controller;

cause the request to be forwarded from the third session controller to the UE; and receive, from the UE, a 200 OK including a current location of the UE obtained by the UE in response to receiving the request from the third session controller; and forward the 200 OK from UE to a client associated with the location inquiry.

20. The system of claim 16, wherein the updating module is further configured to cause the UE to generate and transmit the indication of the current location information to the second session controller, wherein UE obtains the current location information via a global positioning system.

* * * * *